F. D. HILLER, Jr.
LOCKING DEVICE FOR DEMOUNTABLE AUTOMOBILE WHEEL RIMS AND THE LIKE.
APPLICATION FILED OCT. 14, 1915.
1,202,188.
Patented Oct. 24, 1916.
2 SHEETS—SHEET 1.
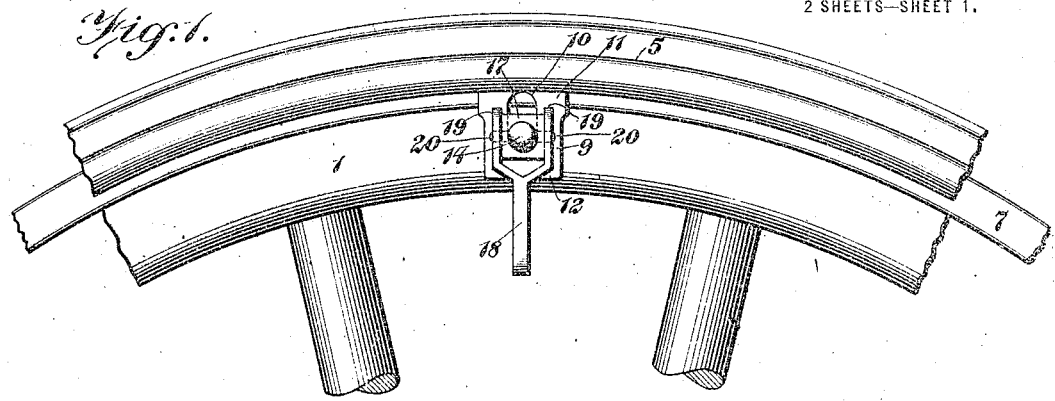
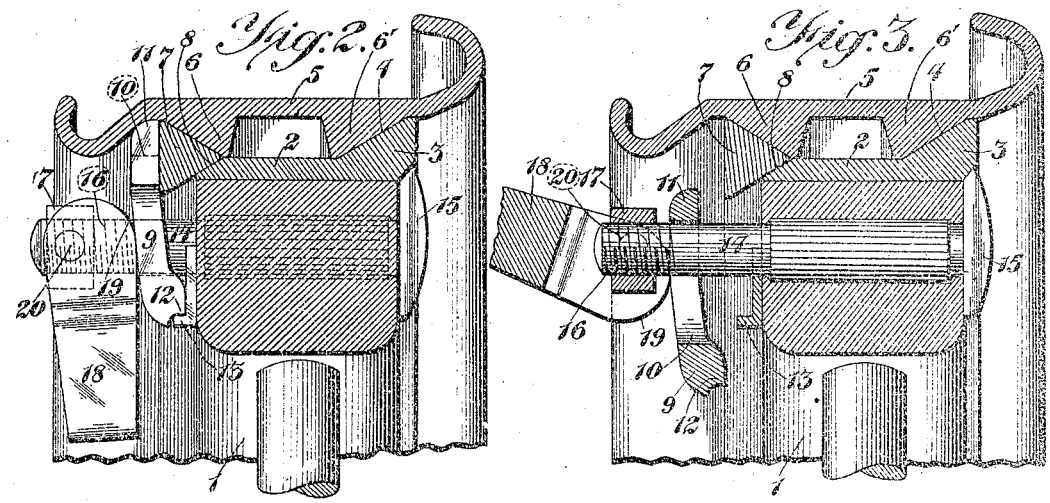
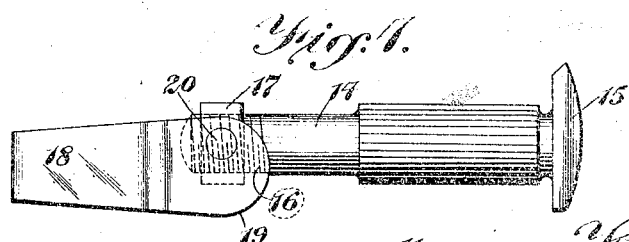
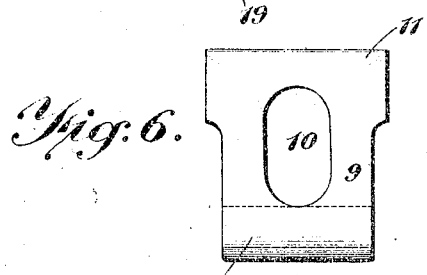
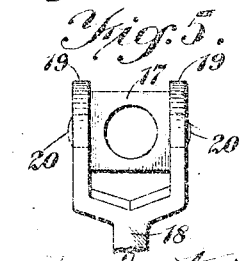

F. D. HILLER, Jr.
LOCKING DEVICE FOR DEMOUNTABLE AUTOMOBILE WHEEL RIMS AND THE LIKE.
APPLICATION FILED OCT. 14, 1915.
1,202,188.
Patented Oct. 24, 1916.
2 SHEETS—SHEET 2.
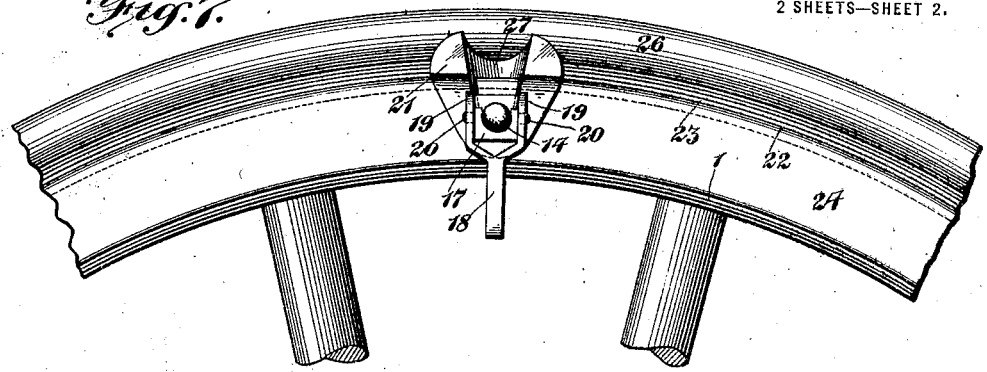
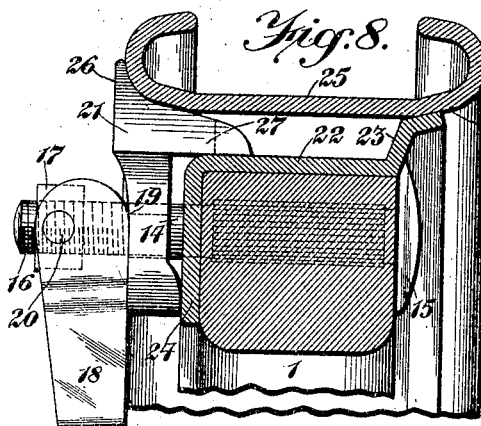
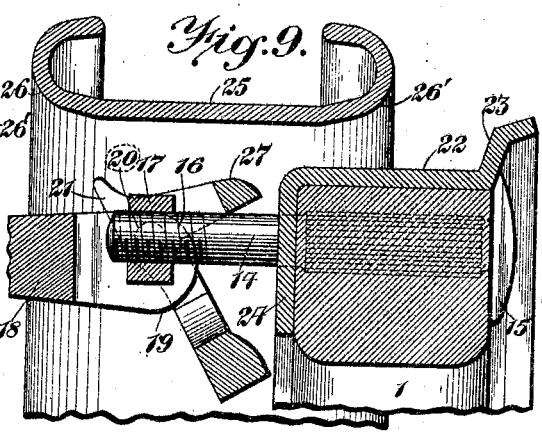
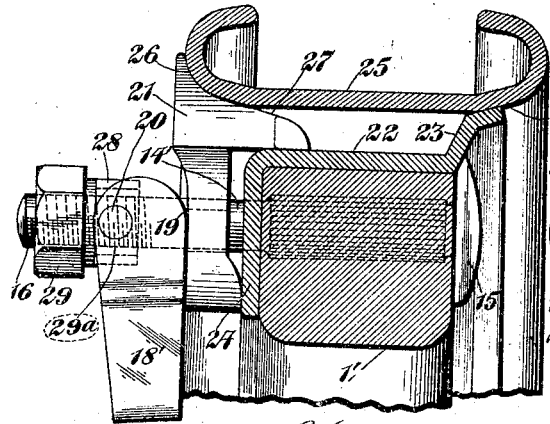
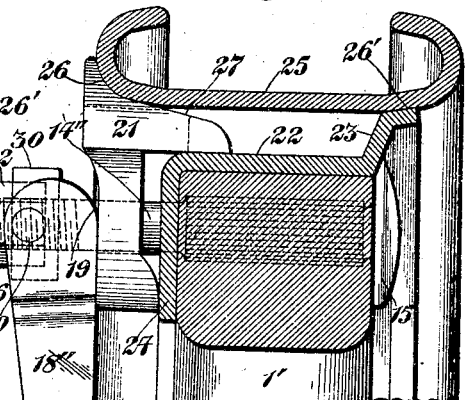
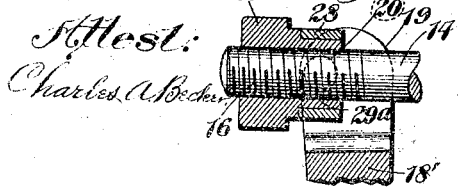
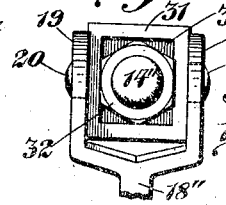
Inventor.
Frank D. Hiller, Jr.
by Ralph Rasch
his Attorney.

UNITED STATES PATENT OFFICE.

FRANK D. HILLER, JR., OF WEBSTER GROVES, MISSOURI, ASSIGNOR TO HIL-KO RIM LOCK COMPANY, OF ST. LOUIS, MISSOURI, A CORPORATION OF MISSOURI.

LOCKING DEVICE FOR DEMOUNTABLE AUTOMOBILE-WHEEL RIMS AND THE LIKE.

1,202,188.

Specification of Letters Patent. Patented Oct. 24, 1916.

Application filed October 14, 1915. Serial No. 55,886.

*To all whom it may concern:*

Be it known that I, FRANK D. HILLER, Jr., a citizen of the United States, residing at Webster Groves, St. Louis county, Missouri, have invented a certain new and useful Improvement in Locking Devices for Demountable Automobile-Wheel Rims and the like, of which the following is a specification, reference being had to the accompanying drawings, forming a part thereof.

This invention relates generally to automobile wheels and the like and, more particularly, to that class of automobile wheels having demountable tire-holding rims, the principal object of my present invention being to provide a simple, comparatively inexpensive, and readily manufactured device capable of easy and convenient manipulation and actuation for quickly, efficiently, and rigidly releasably or detachably locking the demountable rim on the wheel.

With the above and other objects in view, my present invention resides in certain novel features of form, construction, arrangement, and combination of parts, all as will hereinafter be described and afterward pointed out in the claims.

In the accompanying drawings, which show my present invention both in preferred and modified form,—Figure 1 is a fragmentary side elevational view of an automobile-wheel equipped with my invention in preferred form, the same being shown in connection with a wedge-ring and lugs and the usual pneumatic or other tire of the wheel being omitted; Fig. 2 is an enlarged transverse sectional view through the same with my new rim-locking device in rim-locking position; Fig. 3 is a view approximately similar to the view of Fig. 2 with my new rim-locking device in unlocked position; Fig. 4 is a side elevational view of a rim-locking device embodying my invention in preferred form; Fig. 5 is an end elevational view of the same; Fig. 6 is a front elevational view of one of the holding-lugs employed with the wedge-ring of Figs. 1, 2, and 3; Fig. 7 is a view approximately similar to the view of Fig. 1 with my new rim-locking device in preferred form shown in connection with a wedge-lug; Fig. 8 is an enlarged transverse sectional view through the wheel-portion of Fig. 7 with my new rim-locking device in rim-locking position; Fig. 9 is a similar view through the wheel-portion of Fig. 7, my new rim-locking device being shown partly in section in unlocked position and the tire-holding rim partly removed from the wheel; Figs. 10 and 11 are similar views through the wheel-portion of Fig. 7, the same showing, however, slightly modified forms of rim-locking device embodying my invention; Fig. 12 is a vertical sectional view through the form of my rim-locking device shown in Fig. 10; and Fig. 13 is an end view of the form of my rim-locking device, shown in Fig. 11.

Referring to the said drawings, in which like reference characters refer to like parts throughout the several views, 1 indicates the usual wooden felly of an automobile wheel or the like.

Having reference now particularly to Figs. 1, 2, and 3, 2 indicates a relatively wide band fixed to and upon the tread-face of felly 1, band 2 being thickened or otherwise formed at one, or its inner, side edge, as at 3, to provide an outwardly and upwardly disposed oblique or wedge face 4. This band 2 with its wedge face 4 constitutes, in this form of demountable rim, what I will term the fixed rim-engaging member.

5 indicates a demountable rim of one standard construction, this rim, which is adapted, as will be well understood, to engage with and hold a pneumatic or other tire (not shown), including oppositely disposed wedge-portions 6—6'.

In operation or use, rim 5 is adapted to encircle and fit on band 2 with its wedge-portion 6' engaging wedge-portion 3 of said band, as shown in Figs. 2 and 3, a wedge-ring 7 being adapted to engage with wedge-portion 6 of rim 5 and also with band 2, band 2 at its other or outer edge being also provided with an oblique or wedge-face, as at 8, in locking the rim 5 upon the wheel. With the ring 7 are also employed, in this standard form of demountable rim, lugs such as the lug 9 shown particularly in Figs. 2, 3, and 6, this lug 9 having an approximately central somewhat elongated aperture 10, an upper ring-engaging portion 11, and a lower recessed portion 12 adapted to engage upon a flanged plate 13 fixed on felly 1 when the lug is in rim-locking position.

To detachably rigidly lock rim 5, through ring 7 and lug 9, upon the band 2, I employ my new rim-locking device now to be described.

Transversely fitting loosely through felly 1 is a bolt 14 headed at one end, as at 15, to engage upon the felly, as shown particularly in Figs. 2 and 3, and of such length to project suitably beyond the opposite face of the felly, the projecting end of bolt 14 being threaded, as at 16, to adjustably receive a preferably rectangular member or nut 17.

18 indicates a suitable small lever-member bifurcated or otherwise formed to provide a pair of approximately parallel cam-extensions 19—19 suitably annularly rounded at their forward or outer edges. These cam-extensions 19—19 of lever 18 straddle nut or member 17 and movably fit flatwise upon opposite faces thereof, as shown particularly in Fig. 5, lever 18 with its said extensions 19—19 being eccentrically pivotally fastened to nut or member 17 by means of upset pins, rivets, or the like 20 and being hence not only swingably movable relatively to nut 17 and its bolt 14, but also adjustably movable relatively to bolt 14 with said nut 17.

In use or operation, a rim 5 and ring 7 being in operative engaging position relatively to the felly 1 and its fixed band 2 and a bolt 14 being passed transversely through the felly 1 as described, a lug 9 is first loosely fitted by means of its perforation 10 on the projecting or threaded end 16 of the bolt 14. A nut or member 17 with its cam lever 18 is now adjustably threaded upon end 16 of bolt 14 into proper operative position relatively to felly 1 so that, when lever 18 with its cam-extensions 19 is in work-engaging or rim-locking position, the forward or work-engaging face of the lever being then presented or projecting forwardly of the forward face of nut or member 17, the same will tightly impingingly engage upon the lug 9, the lug 9 being in the ring-and-felly engaging position shown in Fig. 2. Nut or member 17 being in said adjusted position on bolt 14, and lug 9 being manually or otherwise supported in its ring-and-felly engaging position shown in Fig. 2, on lever 18 being swung from rim-unlocking to rim-locking position, or from approximately the position thereof shown in Fig. 3 to the position thereof shown in Fig. 2, cam-extensions 19—19 will cam-wise engage with lug 9 and thereby, through lug 9 and ring 7, positively and securely releasably lock rim 5 upon the felly 1 and its fixed band 2. It is, of course, to be understood that the wheel as a whole may be provided with any desired number of bolts 14, lugs 9, and nuts 17 with their levers 18, the same being arranged in the form of an annular series around the wheel, levers 18 with their extensions 19—19, when in rim-locking position, projecting radially inwardly toward the hub of the wheel and thus severally occupying but small space and in no way impeding the rotary movement of the wheel or interfering with parts of the car or vehicle upon which the wheel may be mounted.

To demount the rim 5, it is only necessary to reversely swing levers 18, when lugs 9 are free to fall outwardly away from and out of engagement with ring 7 and felly 1, lugs 9, when in rim-unlocking position, as shown in Fig. 3, being loosely suspended on bolts 14. With lugs 9 in such latter position, ring 7 may be readily removed from engagement with rim 5 and band 2, and rim 5 then conveniently demounted from felly 1.

In Figs. 7, 8, and 9, I also show the preferred form of my new rim-locking device comprising the headed bolt 14 and adjustable nut 17 with its eccentrically pivoted cam-lever 18, but illustrate the same in connection with a somewhat different type of standard demountable rim, employing therewith the wedge-lug 21 shown and described in Letters Patent No. 1,172,287, dated February 22, 1916. In this type of demountable rim, 22 indicates a relatively wide metallic band fixed flatwise upon the tread-face of felly 1', band 22 being provided preferably integrally at one, or its inner, side edge with an outwardly and upwardly disposed flange 23. Projecting laterally and inwardly from band 22 at its opposite or outer side edge, is a continuous or annular flange 24 fitting flatwise upon the outer side face of felly 1'. This band 22 with its flanges 23 and 24 also constitutes what I term the fixed rim-engaging member. Usable with band 22 is another standard form of tire-holding rim 25, rim 25 including oppositely disposed side-portions or flanges 26—26' preferably convexed or curved at their outer side or under faces, as illustrated. In operation or use, rim 25 is adapted similarly to encircle and fit on band 22 with its side portion 26' engaging at its under face with flange 23, as shown particularly in Fig. 8, flange 23 having a correspondingly concaved, curved, or otherwise suitably shaped upper face to engage smoothly, firmly, and positively with side portion 26' of rim 25. To lock rim 25 upon the band 22, a wedge-ring such as ring 7 before described is preferably done away with, but I employ in lieu thereof a plurality of wedge-lugs 21, one lug 21 in connection with each bolt 14, and each of said lugs, as in said application fully described, comprising a wedge-portion 27 adapted to correspondingly engage with the other side portion 26 of rim 25 to demountably lock the rim 25 on the felly 1' and its fixed band 22. Since the use and operation of my new rim-locking device in connection with the lugs 21 are substantially similar to the use and operation thereof in connection with the lugs 9 and ring 7, so far as detachably locking the tire-holding rim upon the wheel is concerned, I will not repeat the same here.

With the same type of demountable rim shown in Figs. 7, 8, and 9, I show in Fig. 10 a slightly modified form of locking device embodying my invention. In this form, 14' indicates a headed bolt similar to bolt 14 and similarly usable. Adapted to loosely fit on the threaded end of bolt 14', is a ring 28 having eccentrically fastened pivotally thereto a cam lever 18' similar in all respects to lever 18. Adjustably threaded on bolt 14', is a nut 29 having a threaded tubular extension 29ᵃ adapted to project into, and tightly fit within, ring 28, as shown particularly in Fig. 12, to securely hold ring 28 with its lever 18' in adjusted positions on bolt 14' relatively to the lugs 21 and felly 1' of the wheel. With this same type of demountable rim, I show in Figs. 11 and 13 another slightly modified form of locking device embodying my invention. In this latter form, 14″ indicates a headed bolt also similar to bolt 14 and similarly usable. Having an aperture or perforation adapted to loosely accommodate the threaded end of bolt 14″ and adapted to loosely fit on the threaded end of bolt 14″, is a preferably substantially rectangular member 30 recessed or undercut on its outer face to provide therearound a preferably continuous flange 31, as shown particularly in Fig. 13. Eccentrically fastened pivotally to member 30 is a cam lever 18″ also similar in all respects to cam lever 18 hereinbefore described. Adjustably threaded on bolt 14″ is a nut 32 adapted to secure member 30 with its lever 18″ in adjusted positions on bolt 14″ relatively to the lugs 21 and felly 1' of the wheel, nut 32 being adapted, when adjusted on bolt 14″, to fit within the confines of, and be surrounded by, flange 31 of member 30, as shown, with flange 31 thereby performing the function of a nut-lock. Otherwise than stated these forms of my new locking device are approximately similar to the preferred form thereof hereinbefore fully described.

My new locking device in its several forms is very simple in construction and may be very cheaply and economically manufactured. I have found my device to be most efficient in positively and rigidly locking and maintaining the demountable rim upon the wheel, being at the same time readily and conveniently manipulated from rim-locking to rim-unlocking position and vice versa, and that my new locking device is well adapted for use in connection with standard types of demountable rims now on the market.

I am aware that minor changes in the form, construction, arrangement, and combination of the several parts of my new locking device may be made and substituted for those herein shown and described without departing from the nature and principle of my invention.

Having thus described my invention, what I claim and desire to secure by Letters Patent is:

1. A locking device for demountable wheel-rims including a bolt adapted to transversely engage the felly of the wheel, an apertured member adapted to fit on said bolt, said member being movable lengthwise of the bolt, and a lever pivotally fastened to said member and movable therewith on the bolt, said lever being swingable at the side of said member and the work-engaging face of the lever projecting forwardly of the forward end of said member when the lever is in locking position.

2. A locking device for demountable wheel-rims including a bolt adapted to transversely engage the felly of the wheel, an apertured member adapted to fit on said bolt, said member being adjustably movable lengthwise of the bolt, and a cam-lever pivotally fastened to said member and movable therewith on the bolt, said lever being swingable at the side of said member and the work-engaging face of the lever projecting forwardly of the forward end of said member when the lever is in locking position.

3. A locking device for demountable wheel-rims including a bolt adapted to transversely engage the felly of the wheel, an apertured member adapted to fit on said bolt, said member being adjustably movable lengthwise of the bolt, and a cam-lever pivotally fastened eccentrically to said member and movable with said member lengthwise of the bolt, said lever being swingable at the side of, and relatively to both, said member and bolt and the work-engaging face of the lever projecting forwardly of the forward end of said member when the lever is in locking position.

4. A locking device for demountable wheel-rims including a headed bolt threaded at one end, said bolt being adapted to be passed transversely through the felly of the wheel, a member adapted to fit on the threaded end of said bolt, said member being adjustably movable lengthwise of the bolt, and a lever having a pair of approximately parallel cam-extensions engaging upon opposite faces of, and pivotally fastened eccentrically to, said member, said lever with its said extensions being swingable relatively to said member and bolt and movable with said member lengthwise of the bolt.

5. A locking device for demountable wheel-rims including a headed bolt threaded at one end, said bolt being adapted to be passed transversely through the felly of the wheel, a member adjustably threaded on the threaded end of said bolt, and a lever having a pair of cam-extensions engaging upon opposite faces of, and pivotally fastened eccentrically to, said member, said lever with its said extensions being swingable relatively to both said member and said bolt and adjustably movable with said member on said bolt.

6. A locking device for demountable wheel-rims including a headed bolt threaded at one end, said bolt being adapted to be passed transversely through the felly of the wheel, a member detachably fitting upon the threaded end of said bolt and adjustably movable upon the bolt lengthwise thereof, and a lever having a pair of approximately parallel cam-extensions engaging upon opposite faces of, and pivotally fastened eccentrically to, said member, said lever with its said cam-extensions being swingable relatively to both said member and said bolt and detachable and movable with said member relatively to the bolt.

7. An apertured member adapted to movably fit upon a supporting-bolt, and a cam-lever pivotally fastened eccentrically to said member, the lever being swingable at the side of said member and presenting its work-engaging face, when in work-engaging position, forwardly of the forward end of said member.

In testimony whereof, I have signed my name to this specification.

FRANK D. HILLER, Jr.